US011904308B2

(12) United States Patent
Muramatsu

(10) Patent No.: US 11,904,308 B2
(45) Date of Patent: Feb. 20, 2024

(54) LIQUID EJECTION UNIT AND LIQUID EJECTION DEVICE

(71) Applicant: RICOH COMPANY, LTD., Tokyo (JP)

(72) Inventor: Koichi Muramatsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/103,155

(22) Filed: Nov. 24, 2020

(65) Prior Publication Data

US 2021/0162742 A1 Jun. 3, 2021

(30) Foreign Application Priority Data

Nov. 29, 2019 (JP) ................................. 2019-217527

(51) Int. Cl.
*B41J 2/045* (2006.01)
*B41J 2/145* (2006.01)
*B01L 3/02* (2006.01)

(52) U.S. Cl.
CPC ......... *B01L 3/0268* (2013.01); *B41J 2/04541* (2013.01); *B41J 2/04581* (2013.01); *B41J 2/145* (2013.01); *B01L 2200/146* (2013.01); *B01L 2400/0481* (2013.01); *B01L 2400/0487* (2013.01)

(58) Field of Classification Search
CPC .............................. B41J 2/1607; B01L 3/0268
See application file for complete search history.

(56) References Cited

U.S. PATENT DOCUMENTS 4,314,263 A 2/1982 Carley
5,927,547 A * 7/1999 Papen ................ G01N 35/1065 436/180
2004/0265185 A1* 12/2004 Kitagawa ................ B01L 13/02 422/400
2005/0169808 A1* 8/2005 Pinkel ...................... B41J 2/005 422/504
2005/0212837 A1 9/2005 Nakagawa et al.
2006/0144331 A1 7/2006 Hanafusa et al.
2007/0035579 A1* 2/2007 Bibl ...................... B01L 3/0268 347/40

(Continued)

FOREIGN PATENT DOCUMENTS

EP 1 548 448 A1 6/2005
EP 1 579 926 A2 9/2005

(Continued)

OTHER PUBLICATIONS

Extended European Search Report dated Mar. 31, 2021 in European Patent Application No. 20209788.7, 8 pages.

(Continued)

*Primary Examiner* — Shelby L Fidler
(74) *Attorney, Agent, or Firm* — Grüneberg and Myers PLLC

(57) ABSTRACT

A liquid ejection unit includes: a liquid holding section which has an ejection port through which a liquid is ejected and which holds the liquid; a pressure adjustment section which is configured to adjust a pressure of a liquid held in the liquid holding section; and a displacement member which is configured to displace at least a part of the liquid whose pressure is adjusted and eject the liquid from the liquid holding section.

11 Claims, 6 Drawing Sheets

(56) References Cited

U.S. PATENT DOCUMENTS

| | | | | |
|---|---|---|---|---|
| 2009/0211985 | A1* | 8/2009 | Gulati | A61M 1/3644 210/90 |
| 2009/0304552 | A1* | 12/2009 | Nishio | C12M 35/00 422/50 |
| 2010/0214334 | A1* | 8/2010 | Kusunoki | B41J 2/04581 347/9 |
| 2012/0304929 | A1* | 12/2012 | Ivri | B05B 15/62 118/712 |
| 2013/0037623 | A1 | 2/2013 | Yamaguchi | |
| 2013/0153677 | A1* | 6/2013 | Leen | G01N 35/1009 239/102.1 |
| 2015/0050719 | A1* | 2/2015 | Bammesberger | B05B 17/06 435/283.1 |
| 2016/0059578 | A1 | 3/2016 | Ishikawa | |
| 2017/0197438 | A1 | 7/2017 | Ishikawa | |
| 2017/0253915 | A1* | 9/2017 | Du | B01L 3/021 |
| 2019/0118546 | A1 | 4/2019 | Ishikawa | |
| 2019/0232661 | A1 | 8/2019 | Akai et al. | |
| 2019/0283402 | A1 | 9/2019 | Kuramochi et al. | |
| 2020/0023328 | A1 | 1/2020 | Kuramochi et al. | |
| 2020/0139704 | A1 | 5/2020 | Muramatsu et al. | |
| 2020/0179919 | A1 | 6/2020 | Yamamoto et al. | |
| 2022/0080742 | A1* | 3/2022 | Granek | B41J 25/3086 |

FOREIGN PATENT DOCUMENTS

| | | | |
|---|---|---|---|
| EP | 3 517 301 | A1 | 7/2019 |
| JP | 2002-116205 | | 4/2002 |
| JP | 3425050 | B2 | 7/2003 |
| JP | 5716213 | B2 | 5/2015 |
| JP | 2019-155268 | | 9/2019 |
| WO | WO 2004/106729 | A1 | 12/2004 |

OTHER PUBLICATIONS

Japanese Office Action dated Aug. 1, 2023, in Japanese Application No. 2019/217527, 3 pages.

* cited by examiner

LIQUID EJECTION UNIT AND LIQUID EJECTION DEVICE

BACKGROUND OF THE INVENTION

Field of the Invention

The present invention relates to a liquid ejection unit and a liquid ejection device.

Priority is claimed on Japanese Patent Application No. 2019-217527, filed Nov. 29, 2019, the content of which is incorporated herein by reference.

Description of Related Art

A liquid ejection device which ejects a liquid material (a liquid) such as ink to a desired position is known in the related art (for example, refer to Japanese Patent No. 5716213). In the liquid ejection device described in Japanese Patent No. 5716213, a piezoelectric element is provided in a part of a pipe provided in an ejection head. Such a liquid ejection device pushes out a liquid in the flow path while pressing the liquid and ejects the liquid by constricting and deforming a flow path using the piezoelectric element.

SUMMARY OF THE INVENTION

In the liquid ejection device as described in Japanese Patent No. 5716213, ejecting various liquids in place of ink used at the time of two-dimensional printing in the related art is required. For example, a liquid to be ejected may be a dispersion liquid as well as a solution. Examples of a dispersoid contained in the dispersion liquid include organic materials such as resin materials, inorganic materials such as metal particles and oxide particles, and biological materials such as cells and genes.

Such various liquids have various viscosities and many liquids have a higher viscosity than the ink used in the two-dimensional printing in the related art. The liquid ejection device described in Japanese Patent No. 5716213 deforms a flow path through the driving of the piezoelectric element and pushes out a liquid through the flow path.

However, if a liquid to be ejected has a high viscosity, even when pressure is applied from the piezoelectric element to the flow path, liquid droplets may be formed on an ejection port of the liquid ejection device while remaining attached to the ejection port and liquid droplets may not fly to an object to which a liquid is ejected in some cases. That is to say, since the liquid ejection device described in Japanese Patent No. 5716213 is not appropriate for ejecting a highly viscous liquid, there has been a demand for a liquid ejection device capable of ejecting a highly viscous liquid.

The present invention is made in view of such circumstances, and an object of the present invention is to provide a liquid ejection unit capable of appropriately ejecting a highly viscous liquid. Furthermore, another object of the present invention is to provide a liquid ejection device having such a liquid ejection unit and capable of appropriately ejecting a highly viscous liquid.

In order to achieve the above objects, one aspect of the present invention provides a liquid ejection unit which includes: a liquid holding section which has an ejection port through which a liquid is ejected and which holds the liquid; a pressure adjustment section which is configured to adjust a pressure of a liquid held in the liquid holding section; and a displacement member which is configured to displace at least a part of the liquid whose pressure is adjusted and eject the liquid from the liquid holding section.

According to the present invention, it is possible to provide a liquid ejection unit capable of appropriately ejecting a highly viscous liquid. Furthermore, it is possible to provide a liquid ejection device having such a liquid ejection unit and capable of appropriately ejecting a highly viscous liquid.

DETAILED DESCRIPTION OF THE INVENTION

First Embodiment

A liquid ejection unit and a liquid ejection device according to a first embodiment of the present invention will be described below with reference to FIGS. 1 to 3. In all the following drawings, in order to make the drawings easy to see, the dimensions, the ratios, and the like of the constituent elements may be appropriately changed.

In the following description, an xyz rectangular coordinate system is utilized and positional relationships between respective members will be described with reference to this xyz rectangular coordinate system. Here, a predetermined direction in a horizontal plane is assumed to be an x axis direction, a direction in the horizontal plane orthogonal to the x axis direction is assumed to be a y axis direction, and a direction (that is, a vertical direction) orthogonal to the x axis direction and the y axis direction is a z axis direction.

Also, an upward direction in the vertical direction is assumed to be a +z direction and a downward direction in the vertical direction is assumed to be a −z direction. Similarly, the words "above", "upward" and "upper" are each assumed to mean the +z direction. The words "below", "downward" and "lower" are each assumed to mean the −z direction.

Furthermore, in the following description, the expression "when viewed in a plan view" is assumed to be viewing an object from above and a "plan shape" is assumed to be a shape when the object is viewed from above.

Figure 1:
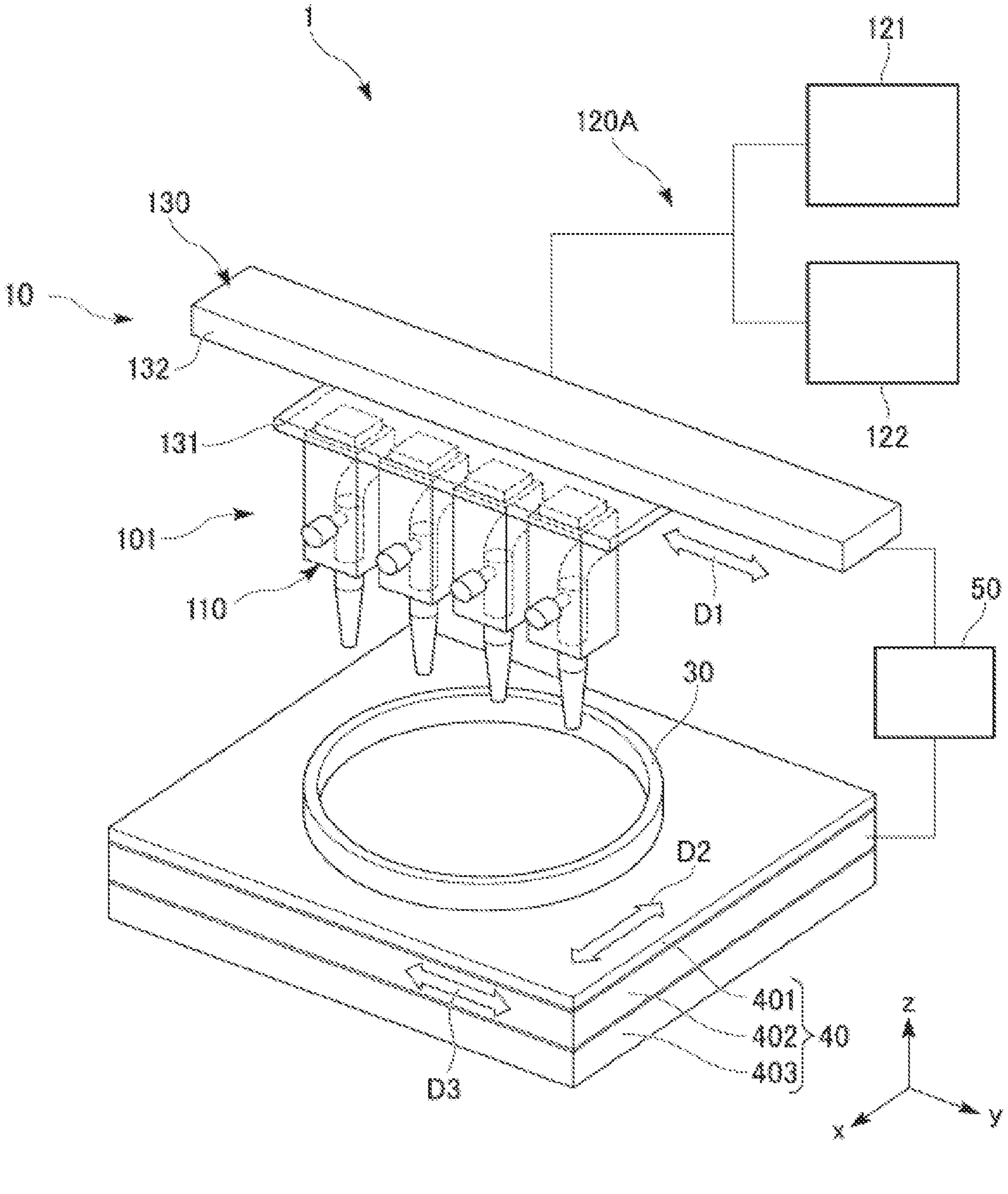
FIG. 1 is a schematic perspective view illustrating liquid ejection units and a liquid ejection device according to a first embodiment.

FIG. 1 is a schematic perspective view illustrating liquid ejection units 101 and a liquid ejection device 1. As illustrated in FIG. 1, the liquid ejection device 1 in this embodiment includes an ejection section 10 configured to hold a liquid and eject the held liquid, an attachment section 30 to which the ejected liquid droplets adhere, a placement section 40 on which the attachment section 30 is placed, and a control unit 50 configured to control an operation of each unit of the liquid ejection device 1.

The liquid ejection device 1 ejects the liquid held in the ejection section 10 toward the attachment section 30. The liquid ejected from the liquid ejection device 1 is not particularly limited and may be a dispersion liquid containing a dispersion medium in which particles are dispersed or a solution.

Examples of the particles dispersed in the dispersion medium include organic materials such as polymer particles and inorganic materials such as fine metal particles and inorganic oxide particles. Furthermore, cells can be used as the particles.

In this embodiment, a description will be provided assuming that the liquid ejected using the liquid ejection device 1 is a dispersion liquid having cells dispersed in a dispersion medium. In this case, as the dispersion medium, well-known buffer solutions such as a phosphate buffered saline and a Hank's balanced salt solution can be used.

<Ejection Section>

The ejection section 10 includes the plurality of (four in FIG. 1) liquid ejection units 101 and a transport section 130 configured to transport each of the liquid ejection units 101.

The plurality of liquid ejection units 101 may eject the same liquid L or may eject liquids L different from each other. In the following description, the liquid L ejected using the liquid ejection unit is a dispersion liquid having particles P dispersed therein.

(Liquid Ejection Unit)

The liquid ejection unit 101 includes a liquid ejection head 110 and a pressure adjustment section 120A connected to the liquid ejection head 110.

The details of the liquid ejection unit 101 will be described later.

(Transport Section)

The transport section 130 includes a support member 131 and a linear movement section 132.

The support member 131 is a rectangular member when viewed in a plan view and supports a plurality of liquid ejection heads 110. The plurality of liquid ejection heads 110 are supported by the support member 131 and arranged along an x axis.

The linear movement section 132 is a long member which extends in the y axis direction. The linear movement section 132 moves the support member 131 horizontally in the y axis direction. Both ends of the linear movement section 132 are supported by the support member (not shown).

The linear movement section 132 can adopt, for example, a known linear actuator including a stepping motor as a drive source.

The transport section 130 moves the support member 131 in the y axis direction, thereby moving a plurality of ejection units 11 supported by the support member 131 in the y axis direction which is a double-headed arrow direction indicated by a reference symbol D1.

<Attachment Section>

The attachment section 30 is arranged in an ejection direction of the liquid droplet L1 ejected from the ejection section 10 and has the liquid droplet L1 adhering thereto. Although the attachment section 30 may be of any type in accordance with a type of liquid L to be ejected, the purpose of ejection, and the like, in this embodiment, a Petri dish is used as the attachment section 30.

Also, the attachment section 30 may be a so-called well plate in which a plurality of wells are arranged in a matrix form at equal intervals or may be a micro-electrode array (MEA) in which micro-electrodes are regularly arranged.

<Placement Section>

The placement section 40 includes an x stage 401, a y stage 402, and a base 403.

The x stage 401 has the attachment section 30 placed thereon and supports and fixes the attachment section 30. Furthermore, the x stage 401 moves the attachment section 30 horizontally in the x axis direction which is a double-headed arrow direction indicated by a reference symbol D2.

The y stage 402 moves the x stage 401 horizontally in the y axis direction which is a double-headed arrow direction indicated by a reference symbol D3.

The base 403 supports the y stage 402.

The placement section 40 can adopt a known constitution as an xy stage.

The transport section 130 and the placement section 40 control relative positions of the liquid ejection unit 101 and the attachment section 30. Thus, in the liquid ejection device 1, it is possible to adhere the liquid ejected from the liquid ejection unit 101 to a desired position on the attachment section 30.

<Control Unit>

The control unit 50 performs control to create a signal for operating each unit of the liquid ejection device 1 and supply the signal to each unit.

The control unit 50 controls an operation of each unit to create, for example, a drive signal to be supplied to the ejection section 10 and a drive signal to be supplied to the placement section 40, and supply the signals to each unit.

<Liquid Ejection Unit>

Figure 2:
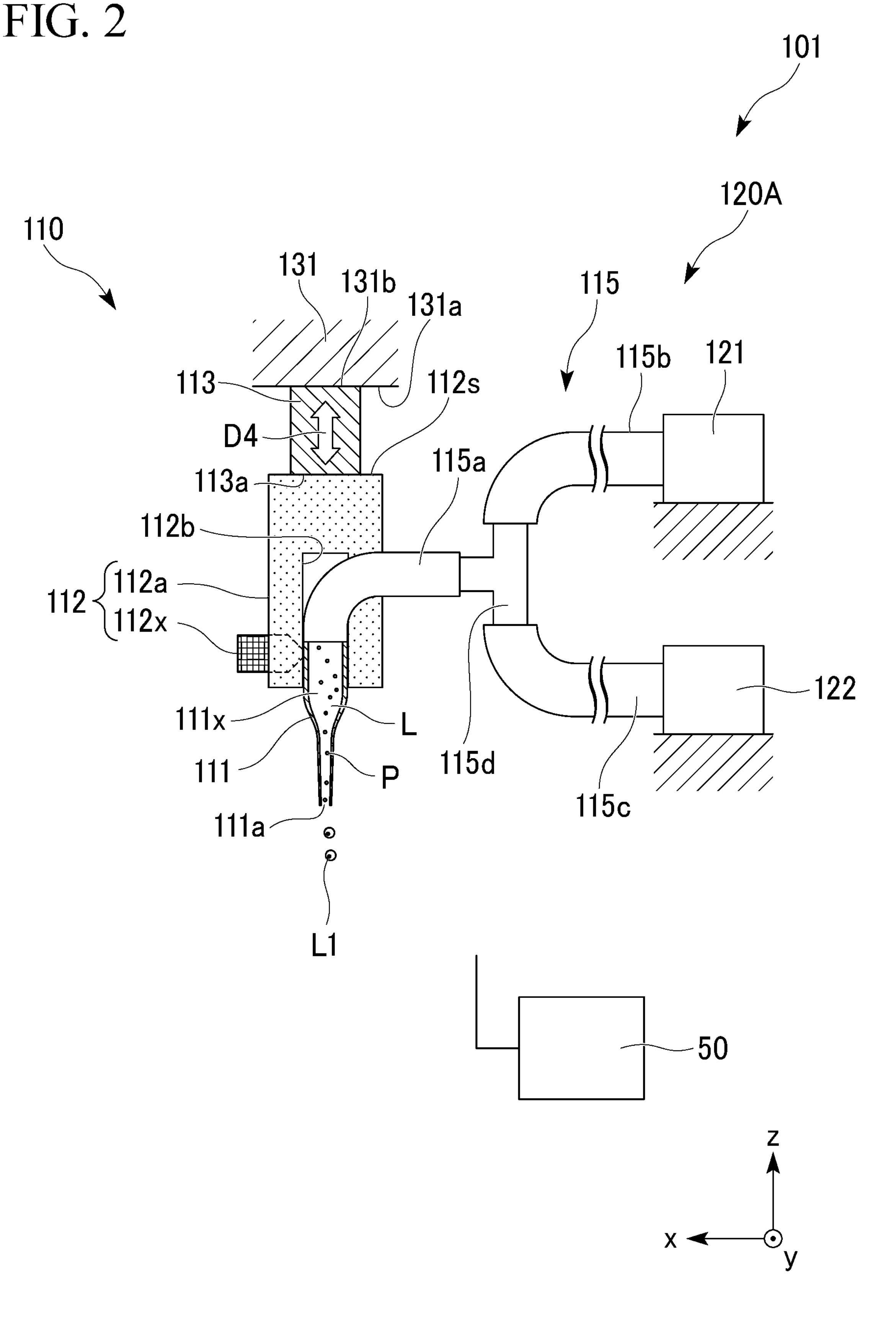
FIG. 2 is a schematic diagram illustrating a liquid ejection unit.

FIG. 2 is a schematic diagram illustrating the liquid ejection unit 101.

The liquid ejection head 110 includes a liquid holding section 111, a support section 112, a displacement member 113, and a pipe 115.

The pressure adjustment section 120A includes a supply section 121 and a detection unit 122.

<Liquid Ejection Head>

(Liquid Holding Section)

The liquid holding section 111 is a tubular member which extends substantially parallel to the z axis direction which is a liquid ejection direction. The liquid holding section 111 is formed of, for example, a material such as glass or a resin material. A wall surface of the liquid holding section 111 facing an inside 111*x* may be subjected to a liquid repellent treatment or a lyophilic treatment in accordance with the characteristics of a liquid L flowing through the inside. As a result, the liquid ejection head enables to eject the liquid appropriately according to the purpose of the present invention.

The liquid holding section 111 may be a tubular member or a plate-like member having a flow path formed therein.

It is desirable that the liquid holding section 111 have light transmissivity so that a state of the liquid L flowing through the inside can be checked.

The liquid holding section 111 has an inner diameter gradually decreasing in the −z direction. A lower end of the liquid holding section 111 is open as an ejection port 111*a*. For example, an outer diameter of the liquid holding section 111 is several mm. Furthermore, an inner diameter of the ejection port 111*a* is several tens of μm or more and several hundreds of μm or less. An upper end of the liquid holding section 111 is connected to the pipe 115.

The liquid holding section 111 ejects the liquid L through the ejection port 111*a* in the −z direction.

(Support Section)

The support section 112 supports the liquid holding section 111 in an attachable or detachable manner. The support section 112 can adopt various commonly known constitutions as long as they can support the liquid holding section 111.

The support section 112 includes a support main body 112*a* which supports the liquid holding section 111 and a screw 112*x* which fixes the liquid holding section 111 to the support main body 112*a*.

In FIG. 2, the support main body 112*a* is shown as a rectangular parallelepiped member having an insertion section 112*b* into which the liquid holding section 111 is inserted. The screw 112*x* fixes the liquid holding section 111 inserted into the insertion section 112*b* in a screw manner.

(Displacement Member)

The displacement member 113 is a rectangular member when viewed in a plan view provided on an upper surface 112*s* of the support main body 112*a*. In FIG. 1, a shape of the displacement member 113 when viewed in a plan view is shown as a square. For example, the shape of the displacement member 113 when viewed in a plan view is a square of several mm×several mm.

The displacement member 113 is provided at a position in which the displacement member 113 and the liquid holding section 111 overlap when viewed in a plan view. The shape of the displacement member 113 when viewed in a plan view is larger than a shape of the liquid holding section 111 when viewed in a plan view. The shape of the displacement member 113 when viewed in a plan view is a square. A length of one side of the square is longer than the outer diameter of the liquid holding section 111.

The displacement member 113 has a lower surface 113*a* adhered to the upper surface 112*s* of the support main body 112*a* and an upper surface 113*b* adhered to a lower surface 131*a* of the support member 131.

Although a piezoelectric element, an actuator constituted of a magnet and a coil, and the like can be used as the displacement member 113, it is desirable that a piezoelectric element be used. The piezoelectric element can have, for example, a structure in which electrodes for applying a voltage are provided on an upper surface and a lower surface of a piezoelectric material. In this case, the displacement member 113 applies a compressive stress in a lateral direction of the upper and lower electrodes by applying a voltage between the upper and lower electrodes of the displacement member 113 (the piezoelectric element) from the control unit 50. Thus, the displacement member 113 vibrates in an upward/downward direction of a film surface (a double-headed arrow direction indicated by a reference symbol D4 in the drawing).

The vibration direction of the displacement member 113 is the z axis direction and is set to be substantially parallel to the ejection direction of the liquid L. Here, the word "substantially" in the expression "substantially parallel" means that it is not required that the vibration direction of the displacement member 113 and the ejection direction of the liquid L be mathematically strictly parallel to the z axis. For example, the vibration direction of the displacement member 113 may be tilted within ±10° with respect to an z axis when the ejection direction of the liquid L (that is, the z axis direction) is 0°.

By performing the operation as described above, the displacement member 113 displaces the support section 112 substantially parallel to the ejection direction of the liquid L and further displaces at least a part of the liquid L held by the liquid holding section 111 and the liquid holding section 111 supported by the support section 112.

In this specification, "displacement" refers to changing a position of a subject. In addition, in this embodiment, "displacement" means that a subject changes coordinates in the xyz rectangular coordinate system. In this meaning, the displacement of the liquid holding section 111 refers to changing coordinates of the liquid holding section 111 in the xyz rectangular coordinate system. In this embodiment, the liquid holding section 111 is displaced in the z axis direction due to the vibration of the displacement member 113.

The piezoelectric material is not particularly limited and may be appropriately selected in accordance with the purpose thereof. In addition, examples thereof include lead zirconate titanate (PZT), bismuth iron oxide, metal niobate, barium titanate, and materials obtained by adding a metal or a different oxide to these materials. Among these, lead zirconate titanate (PZT) is preferable.

(Pipe)

The pipe 115 connects the liquid holding section 111 to the pressure adjustment section 120A. The pipe 115 includes a first pipe 115*a*, a second pipe 115*b*, a third pipe 115*c*, and a branch pipe 115*d*.

The first pipe 115*a*, the second pipe 115*b*, and the third pipe 115*c* are pipes formed of a soft resin material. Examples of the soft resin material include polyurethane, silicone rubber, fluororesin, and the like.

The branch pipe 115*d* is a three-way pipe (a three-way joint) and can adopt a commonly known constitution.

In the pipe 115, one end of the first pipe 115*a* is connected to the upper end of the liquid holding section 111. The other end of the first pipe 115*a* is connected to the branch pipe 115*d*.

The second pipe 115*b* and the third pipe 115*c* are connected to the branch pipe 115*d*. The second pipe 115*b* has one end connected to the branch pipe 115*d* and the other end connected to the supply section 121. The third pipe 115*c* has one end connected to the branch pipe 115*d* and the other end connected to the detection unit 122.

<Pressure Adjustment Section>

(Supply Section)

The supply section 121 is connected via the liquid holding section 111 and the pipe 115 and supplies the liquid L to the liquid holding section 111 in a closed system. The supply section 121 may be any section as long as it can supply a liquid, may be, for example, a section which supplies the liquid L using the force of gravity or the like, and may be a section which can supply a liquid at a desired rate using a microvolume-pump such as a syringe pump, a tube pump, or a diaphragm pump.

Also, the supply section 121 may also have a function as an adjustment section which adjusts the pressure of the liquid L held in the liquid holding section 111. To be specific, if the liquid L is supplied from the supply section 121 toward the liquid holding section 111, the pressure of the liquid L increases. In addition, if the supply section 121 suctions the liquid L from the liquid holding section 111, the pressure of the liquid L decreases.

(Detection Unit)

The detection unit 122 detects the pressures of the liquid L held in the liquid holding section 111. For example, a semiconductor diaphragm type pressure sensor can be adopted for the detection unit 122.

FIGS. 3A to 3D are explanatory diagrams illustrating a state in which the liquid ejection unit 101 ejects the liquid L and are schematic diagrams illustrating a state in the vicinity of the ejection port 111*a* of the liquid holding section 111.

Figure 3A:
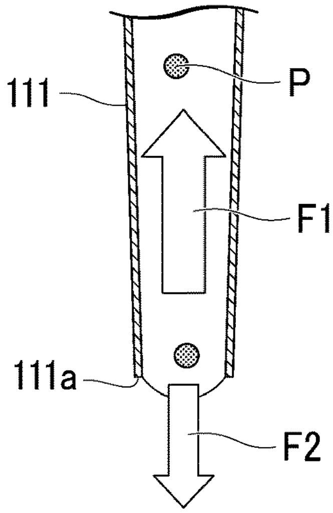
FIGS. 3A to 3D are explanatory diagrams illustrating a state in which a liquid ejection unit ejects a liquid L.

FIG. 3A illustrates the liquid holding section 111 in a state being left to stands still.

If the liquid L is supplied to the inside 111*x* of the liquid holding section 111, a capillary phenomenon occurs in the liquid holding section 111 due to the surface tension of the liquid L. Thus, a force F1 for pulling up the liquid L in the liquid holding section 111 in the +z direction is applied to the liquid L.

On the other hand, the force of gravity is applied to the liquid L in the −z direction. Furthermore, a force is applied to the liquid L in the vicinity of the ejection port 111*a* from the ejection port 111*a* toward the outside in accordance with the pressure of the liquid L. Thus, a force F2 which pushes down the liquid L in the liquid holding section 111 in the −z direction is applied to the liquid L.

In the liquid holding section 111, in a state in which the force F2 is smaller than the force F1, even through the lower end of the liquid holding section 111 is open, the liquid L is held in the inside 111*x* of the liquid holding section 111 without being discharged through the ejection port 111*a*.

Figure 3B:
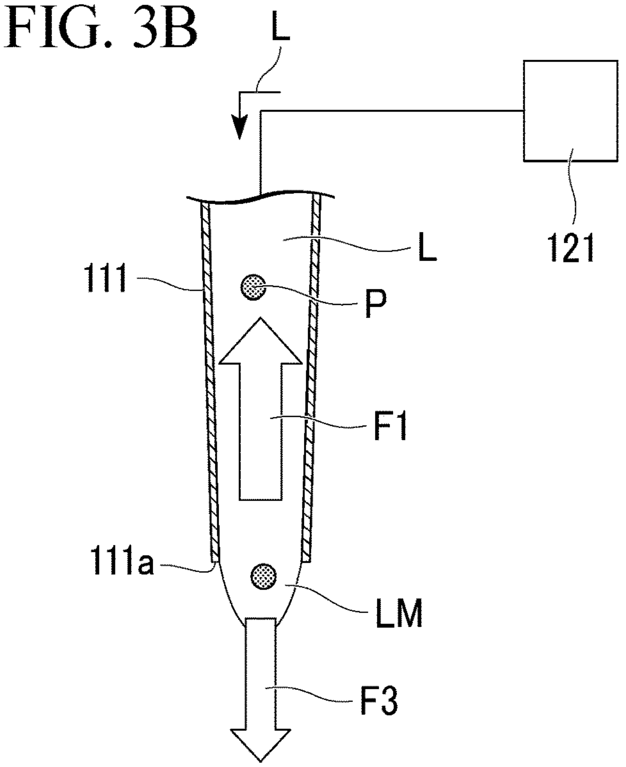

Subsequently, as illustrated in FIG. 3B, the liquid L is supplied from the supply section 121 to the liquid holding section 111. In the liquid ejection unit 101, the liquid holding section 111 to the pressure adjustment section 120A are connected in a closed system. For this reason, if the liquid L is supplied from the supply section 121 to the liquid holding section 111, in the liquid holding section 111, the liquid Lis pressurized in accordance with a supply pressure of the liquid L. Thus, in the liquid holding section 111, a force F3 which pushes down the liquid L in the −z direction becomes larger than the force F2 in FIG. 3A.

At this time, if a state in which the force F1 is larger than the force F3 is provided, in the ejection port 111*a* of the liquid holding section 111, the liquid L is held in the ejection port 111*a*. On the other hand, since the force F3 is larger than the force F2, the liquid L in the ejection port 111*a* is pushed out in the −z direction, projects, and forms a meniscus LM.

Figure 3C:
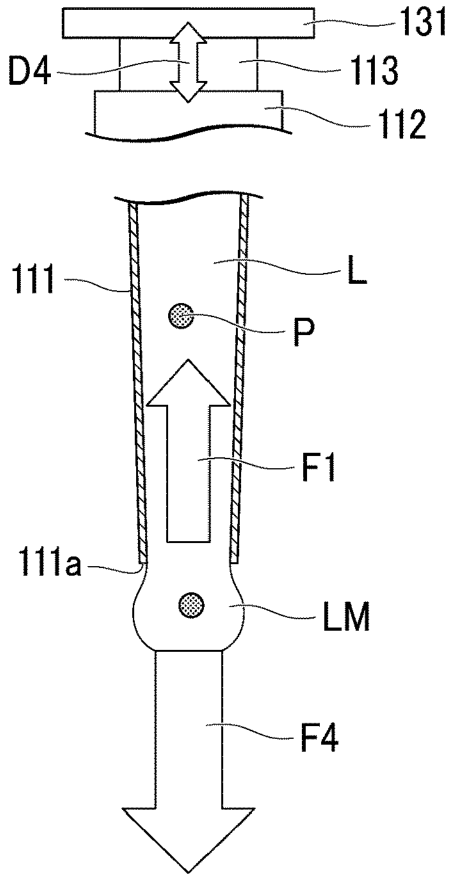

Subsequently, as illustrated in FIG. 3C, if the displacement member 113 displaces the liquid holding section 111, an inertial force applied in the z direction is applied to the liquid L and the meniscus LM due to the vibration of the displacement member 113. Thus, in the ejection port 111*a*, a force F4 which pushes down the meniscus LM of the liquid L in the −z direction becomes larger than the force F3 in FIG. 3B.

Figure 3D:
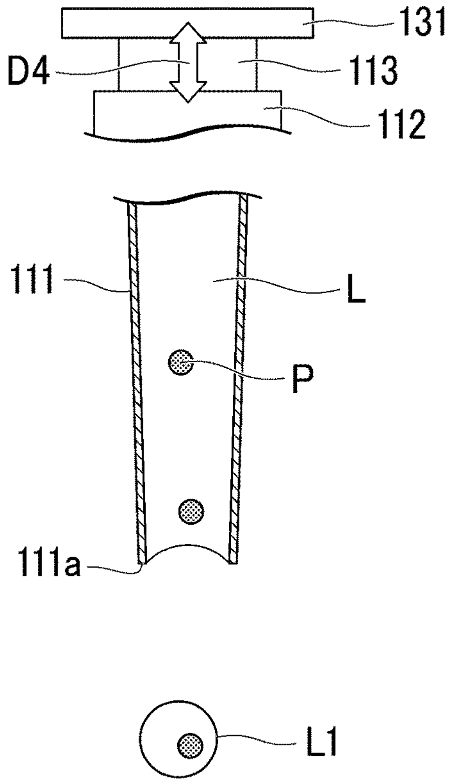

If the force F4 is larger than the force F1, a shape of the meniscus LM cannot be maintained in the ejection port 111*a*. In addition, as illustrated in FIG. 3D, the meniscus LM is separated from the ejection port 111*a* and flies as a liquid droplet L1.

If the supply section 121 is continuously driven, as illustrated in FIG. 3B, the liquid L is continuously supplied from the supply section 121 to the liquid holding section 111. Furthermore, if the displacement member 113 is continuously driven, the liquid holding section 111 continuously vibrates in the z axis direction. For this reason, if the supply section 121 and the displacement member 113 are continuously driven, in the liquid holding section 111, the phenomenon illustrated in FIGS. 3B to 3D repeatedly occurs and it is possible to continuously eject a liquid droplet L1.

Here, the detection unit 122 of the pressure adjustment section 120A illustrated in FIG. 2 detects the pressure of the liquid L pressurized using the supply section 121. When the liquid ejection device 1 is used, it is advisable that a correspondence relationship between the pressure of the liquid L and the state of the liquid droplet L1 to be ejected is checked in advance through a preliminary experiment. Thus, the pressure of the liquid L in which the liquid droplet L1 is enabled to be appropriately ejected may be checked.

Examples of the "state of the liquid droplet L1 to be ejected" include a volume of the liquid droplet L1, an adhering position of the liquid droplet L1 in the attachment section 30, and the like.

Also, an appropriate pressure of the liquid L is input to the control unit 50 in advance as the pressure of the liquid L when the liquid is ejected. The control unit 50 adjusts the pressure of the liquid L on the basis of the detection result of the detection unit 122 so that the pressure of the liquid L approaches a predetermined set value of the ejecting pressure of the liquid L.

That is to say, when the detection result of the detection unit 122 is higher than the set pressure, the control unit 50 controls the supply section 121 so that the amount of liquid L to be supplied from the supply section 121 is reduced.

Also, when the detection result of the detection unit 122 is lower than the set pressure, the control unit 50 controls the supply section 121 so that the amount of liquid L to be supplied from the supply section 121 is increased.

Thus, the liquid ejection unit 101 can appropriately adjust the pressure of the liquid L on the basis of the detection result of the detection unit 122 and eject the liquid droplet L1.

As described above, in the liquid ejection unit 101 in this embodiment, the pressure adjustment section 120A which adjusts the pressure of the liquid L held in the liquid holding section 111 and the displacement member 113 which displaces the liquid holding section 111 are configured to have different constitutions. Thus, the following effects are achieved.

First, a case in which the liquid ejection unit does not have the constitution configured to adjust the pressure of the liquid Las described above is considered. In this case, the pressure of the liquid L in the ejection port 111*a* of the liquid holding section 111 is determined in accordance with a height (a depth) from a liquid surface of the liquid L in the liquid holding section 111 to the ejection port. In such a case, when a highly viscous liquid L is to be ejected, it may be necessary to increase a size of the liquid holding section 111 and increase the height from the liquid surface to the ejection port.

On the other hand, the liquid ejection unit 101 in this embodiment includes the pressure adjustment section 120A configured to adjust the pressure of the liquid L held in the liquid holding section 111. For this reason, also when the highly viscous liquid L is to be ejected, it is possible to appropriately adjust the pressure of the liquid L by adjusting the pressure applied to the liquid L of the liquid holding section 111 using the pressure adjustment section 120A. Thus, in the liquid ejection unit 101 in this embodiment, it is possible to reduce a size of a device.

Also, when a constitution in which the supply section 121 configured to supply the liquid L to the liquid holding section 111 adjusts the pressure of the liquid Las in the liquid ejection unit 101, it is also possible to utilize this constitution as a dispenser configured to continuously discharge the liquid L from the liquid ejection unit 101 by continuously supplying the liquid L from the supply section 121.

Furthermore, for example, a constitution in which a part of a flow path through which a liquid flows is deformed, a part of a liquid held in the liquid holding section is displaced, and a liquid is ejected may be considered for the liquid ejection unit. hi this case, if a highly viscous liquid is to be ejected, it becomes necessary to deform a part of the flow path greatly or strongly. For example, if a piezoelectric element is adopted for a constitution in which the flow path is deformed, in order to greatly or strongly deform a part of the flow path, it may be necessary to increase a size of the piezoelectric element.

On the other hand, since the displacement member 113 and the pressure adjustment section 120A are separate bodies in the liquid ejection unit 101, it is possible to independently control an operation of the pressure adjustment section 120A in the state of FIG. 3B and an operation of the displacement member 113 in the states of FIGS. 3C and 3D. For this reason, for example, when liquids with different viscosities are ejected, when the driving conditions of the pressure adjustment section 120A are adjusted in accordance with the viscosities of the liquids, it is possible to appropriately eject the liquids by simply driving the displacement member 113 under a constant driving condition.

Also, as illustrated in FIGS. 3A to 3D, in the liquid ejection unit 101, the displacement member 113 and the pressure adjustment section 120A share a force applied to eject the liquid L from the liquid holding section 111 (a force applied to change the force F2 to the force F4). For this reason, even with the small displacement member 113, it is possible to appropriately eject the liquid L. Thus, in the liquid ejection unit 101 in this embodiment, it is possible to reduce the size of a device.

According to the liquid ejection unit 101 having the above-described constitution, it is possible to provide a liquid ejection unit which can appropriately eject a highly viscous liquid.

Also, according to the liquid ejection device 1 having the above-described constitution, since the above-described liquid ejection unit is provided, it is possible to appropriately eject a highly viscous liquid.

Although the pressure adjustment section 120A supplies the liquid L to the liquid holding section 111 using the supply section 121 and pressurizes the liquid Lin this embodiment, the pressure adjustment of the liquid L using the pressure adjustment section 120A is not limited thereto. The pressure adjustment section 120A may suction the liquid L from the liquid holding section 111 and adjust the pressure of the liquid L to be decreased.

In this case, for example, first, when the inside of the liquid holding section 111 is set to a negative pressure using the pressure adjustment section 120A, the meniscus of the ejection port 111*a* is suctioned into the liquid holding section. After that, it is possible to eject a liquid droplet by displacing the displacement member 113 and displacing the liquid holding section 111 at a timing at which the meniscus naturally returns to the ejection port 111*a* or at a timing at which the inside of the liquid holding section 111 is set to a positive pressure by performing pressurizing using the pressure adjustment section 120A.

If the liqud L is ejected by driving the displacement member 113 in a state in which the pressure of the liquid L is reduced, a diameter of the generated liquid droplet L1 tends to become smaller than a diameter of the liquid droplet L1 of the liquid when the pressurized liquid L is ejected.

Also, although the liquid ejection device 1 in this embodiment has the plurality of liquid ejection units 101, the present invention is not limited thereto. In addition, a constitution having only one liquid ejection unit 101 may be used.

Furthermore, although the displacement member 113 displaces the liquid L substantially parallel to the ejection direction of the liquid L in the liquid ejection unit 101 in this embodiment, the present invention is not limited thereto. Even if the displacement member 113 is configured to displace the liquid L in a direction intersecting the ejection direction of the liquid L, it is possible to appropriately eject a highly viscous liquid and it is possible to make a liquid ejection unit configured to solve the problems of the present invention.

Second Embodiment

Figure 4:
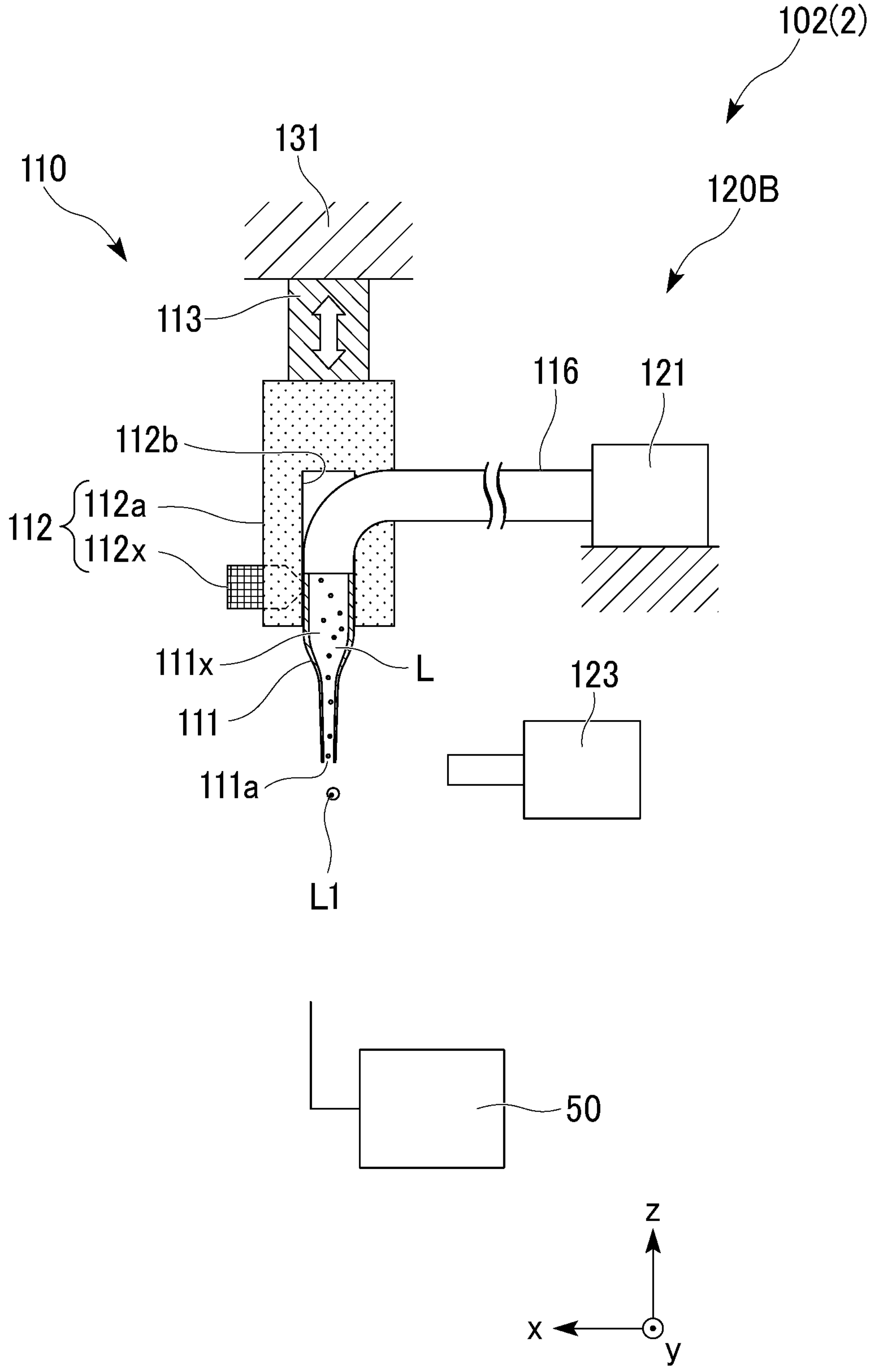
FIG. 4 is an explanatory diagram of a liquid ejection unit and a liquid ejection device according to a second embodiment.

FIG. 4 is an explanatory diagram of a liquid ejection unit and the liquid ejection device according to a second embodiment of the present invention and is a diagram corresponding to FIG. 2. A liquid ejection unit 102 in this embodiment is partially the same as the liquid ejection unit 101 in the first embodiment. Therefore, constituent elements in this embodiment that are the same as those of the first embodiment will be denoted by the same reference symbols and a detailed description thereof will be omitted.

The liquid ejection unit 102 includes a liquid ejection head 110 and a pressure adjustment section 120B.

A liquid ejection device 2 in this embodiment has a constitution in which the liquid ejection unit 101 in the above-described liquid ejection device 1 is replaced with the liquid ejection unit 102.

(Pressure Adjustment Section)

The pressure adjustment section 120B includes a supply section 121 and a detection unit 123.

The supply section 121 is connected via a liquid holding section 111 and a pipe 116. The pipe 116 can have the same constitution as the above-described first pipe 115*a*.

The detection unit 123 is an observation device configured to observe a state of a meniscus formed using an ejection port 111*a*. The "state of the meniscus" includes at least one selected from the group consisting of a shape and a volume of the meniscus and a formation position of the meniscus. Examples of the detection unit 123 include an imaging device configured to capture a meniscus and a laser measuring device configured to detect a position, a size, and a shape of a meniscus.

It is possible to detect a movement state of a meniscus by continuously detecting a position of the meniscus. The "movement state of the meniscus" includes an amplitude and a phase of the vibration of the meniscus by driving a displacement member.

When the liquid ejection device 2 including the liquid ejection unit 102 is used, a correspondence relationship between a state of the meniscus and a pressure of a liquid L is checked in advance using a preliminary experiment.

The state of the meniscus changes in accordance with the pressure of the liquid L. Thus, even if the pressure of the liquid L is not directly measured, the liquid ejection unit 102 can indirectly detect the pressure of the liquid L by checking the state of the meniscus using the detection unit 123.

Also, the correspondence relationship between a pressure of the liquid L and a state of the liquid droplet L1 to be ejected is checked in advance through a preliminary experiment.

An appropriate pressure of the liquid L is input to a control unit 50 in advance as the pressure of the liquid L when the liquid is ejected. Furthermore, the correspondence relationship between the state of the meniscus and the pressure of the liquid L is stored in advance in the control unit 50. Such a control unit 50 indirectly detects the pressure of the liquid L from the state of the meniscus on the basis of the detection result of the detection unit 123 and adjusts the pressure of the liquid L to approach a predetermined set value of the ejecting pressure of the liquid L.

That is to say, when the pressure of the liquid L indirectly detected from the detection result of the detection unit 123 is higher than a set pressure, the control unit 50 controls the supply section 121 to reduce an amount of liquid L to be supplied from the supply section 121.

Also, when the pressure of the liquid L indirectly detected from the detection result of the detection unit 123 is lower than the set pressure, the control unit 50 controls the supply section 121 to increase the amount of liquid L to be supplied from the supply section 121.

Thus, the liquid ejection unit 102 can appropriately adjust the pressure of the liquid L on the basis of the detection result of the detection unit 123 and eject a liquid droplet L1.

Although the detection unit 123 detects the state of the meniscus formed in an ejection port in this embodiment, the present invention is not limited thereto. The detection unit 123 may observe a state of a liquid droplet L1 ejected from the liquid holding section 111 when the liquid droplet L1 flies.

The "state of the liquid droplet L1 when the liquid droplet L1 flies" includes at least one selected from the group consisting of a shape and a volume of a liquid droplet L1, a speed of the liquid droplet L1, and a flight position of the liquid droplet L1. Examples of the detection unit 123 include an imaging device configured to capture a liquid droplet L1 and a laser measuring device configured to detect a size, a shape, and movement of the liquid droplet L1.

When the liquid ejection device 2 including the liquid ejection unit 102 is used, the correspondence relationship between a state of the liquid droplet L1 and a pressure of the liquid L is checked in advance using a preliminary experiment.

The state of the liquid droplet L1 changes in accordance with the pressure of the liquid L. Thus, even if the pressure of the liquid L is not directly measured, the liquid ejection unit 102 can indirectly detect the pressure of the liquid L by checking the state of the liquid droplet L1 using the detection unit 123.

Also, the correspondence relationship between a pressure of the liquid L and a state of the liquid droplet L1 to be ejected is checked in advance using a preliminary experiment.

An appropriate pressure of the liquid L is input to the control unit 50 in advance as the pressure of the liquid L when the liquid is ejected. Furthermore, a correspondence relationship between a state of the meniscus and a pressure of the liquid L is stored in the control unit 50 in advance. Such a control unit 50 indirectly detects the pressure of the liquid L from the state of the liquid droplet L1 on the basis of the detection result of the detection unit 123 and adjusts the pressure of the liquid L to approach a predetermined set value of the ejecting pressure of the liquid L. A pressure adjustment method of the liquid L may be the same as an adjustment method after the above-described state of the meniscus is detected.

Thus, the liquid ejection unit 102 can appropriately adjust the pressure of the liquid L on the basis of the detection result of the detection unit 123 and eject a liquid droplet L1.

With the liquid ejection unit 102 configured as described above, it is possible to provide a liquid ejection unit which can appropriately eject a highly viscous liquid.

With the liquid ejection device 2 configured as described above, since the above-described liquid ejection unit is provided, it is possible to appropriately eject a highly viscous liquid.

Although both a device configured to detect a state of a meniscus and a device configured to detect a state of a liquid droplet L1 when the liquid droplet L1 flies have been described as the detection unit 123, the liquid ejection device may include both of these two types of detection units 123. In this case, the control unit 50 may indirectly detect the pressure of the liquid L on the basis of the detection result of the two types of detection units 123 and control the pressure of the liquid L.

Third Embodiment

Figure 5:
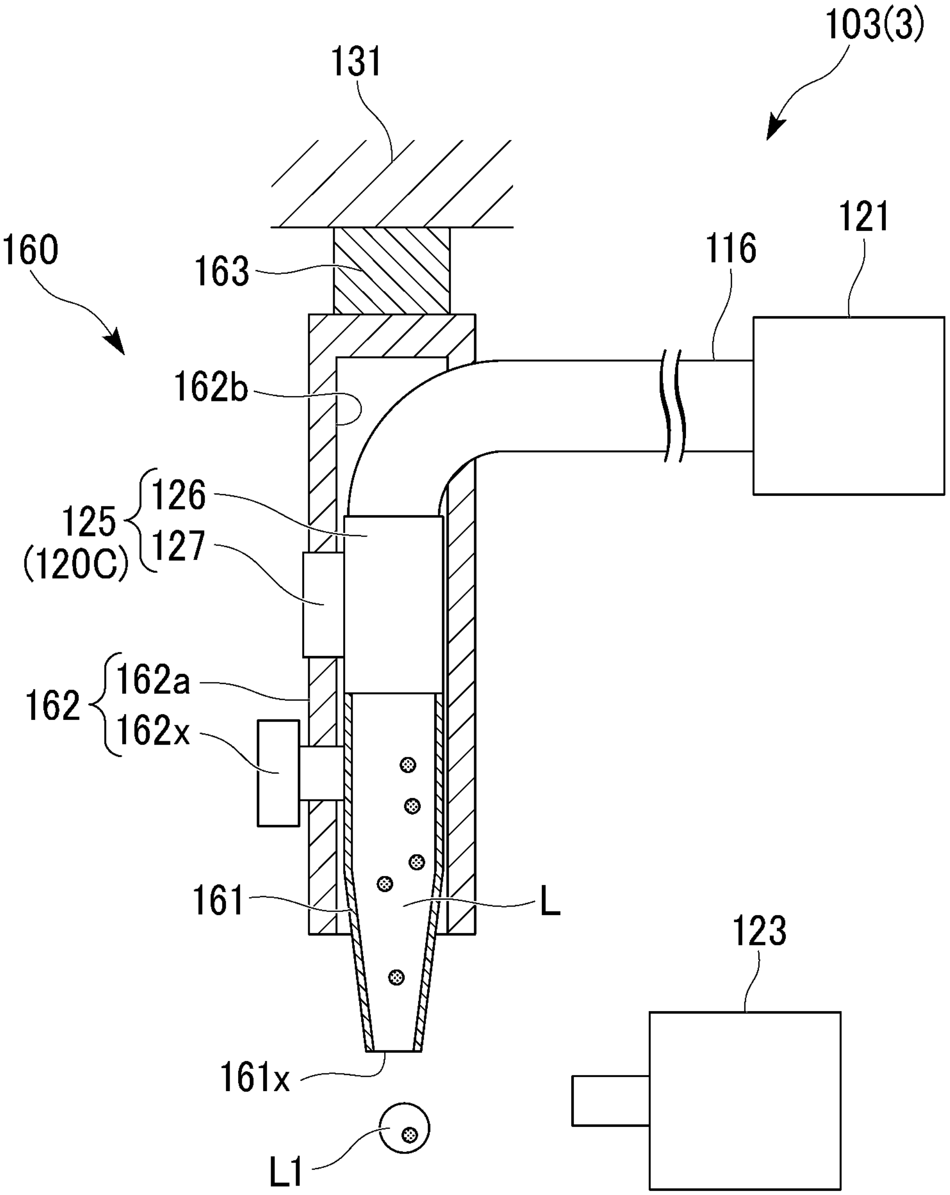
FIG. 5 is an explanatory diagram of a liquid ejection unit and a liquid ejection device according to a third embodiment.

FIG. 5 is an explanatory diagram of a liquid ejection unit and a liquid ejection device according to a third embodiment of the present invention and is a diagram corresponding to FIGS. 2 and 4. A liquid ejection unit 103 in this embodiment is partially the same as the liquid ejection unit in the above-described embodiments. Therefore, constituent elements in this embodiment that are the same as those of the above-described embodiments will be denoted by the same reference symbols and a detailed description thereof will be omitted.

A liquid ejection unit 103 includes a liquid ejection head 160 and a pressure adjustment section 120C.

A liquid ejection device 3 in this embodiment has a constitution in which the liquid ejection unit 101 in the above-described liquid ejection device 1 is replaced with the liquid ejection unit 103.

The liquid ejection head 160 includes a liquid holding section 161, a support section 162, a displacement member 163, and a pipe 116.

<Liquid Ejection Head>

(Liquid Holding Section)

The liquid holding section 161 can adopt the same constitution as the above-described liquid holding section 111.

(Support Section)

The support section 162 supports the liquid holding section 161 in an attachable and detachable manner. The support section 162 can adopt various commonly known constitutions as long as they can support the liquid holding section 161.

The support section 162 includes a support main body 162*a* configured to support the liquid holding section 161 and a screw 162*x* configured to fix the liquid holding section 161 to the support main body 162*a*.

(Displacement Member)

The displacement member 163 can adopt the same constitution as the above-described displacement member 113.

(Pipe)

The pipe 116 connects the liquid holding section 161 to the supply section 121.

<Pressure Adjustment Section>

The pressure adjustment section 120C includes a pressurizing section 125 and a detection unit 123.

(Pressurizing Section)

The pressurizing section 125 includes a soft section 126 and a pressing section 127.

The soft section 126 is a tubular member which is provided by connecting the liquid holding section 161 to the pipe 116 and is in communication with the liquid holding section 161 and the pipe 116. The soft section 126 includes a soft resin material as a forming material. Examples of the soft resin material include polyurethane, silicone rubber, and fluororesin.

The soft section 126 may be formed integrally with the pipe 116 or may be a separate member.

The pressing section 127 is a member provided on the soft section 126 and configured to press the soft section 126 in accordance with an instruction from a control unit 50. The pressing section 127 can adopt various known constitutions as long as they can press the soft section 126. For example, the pressing section 127 can have the same piezoelectric element as the above-described displacement member 113.

In the pressurizing section 125, the soft section 126 having the pressing section 127 provided therein is pressurized and compressed by supplying electricity to the pressing section (a piezoelectric element) 127 and compressing the pressing section 127. Thus, a liquid L inside the soft section 126 and the liquid holding section 161 is pressurized and a part of the liquid L is pushed out through an ejection port 161*x* of the liquid holding section 161.

In the liquid ejection unit 103 as described above, first, when the liquid L in the liquid holding section 161 is pressurized in the pressurizing section 125, in the ejection port 161*x* of the liquid holding section 161, a part of the liquid L held in the liquid holding section 161 is pushed out and a meniscus is formed.

Subsequently, a liquid droplet is ejected in the same driving manner as in FIG. 3 by driving the displacement member 163 and displacing the liquid holding section 161.

With the liquid ejection unit 103 configured as described above, it is possible to provide a liquid ejection unit which can appropriately eject a highly viscous liquid.

In addition, with the liquid ejection device 3 configured as described above, since the above-described liquid ejection unit is provided, it is possible to appropriately eject a highly viscous liquid.

Fourth Embodiment

Figure 6:
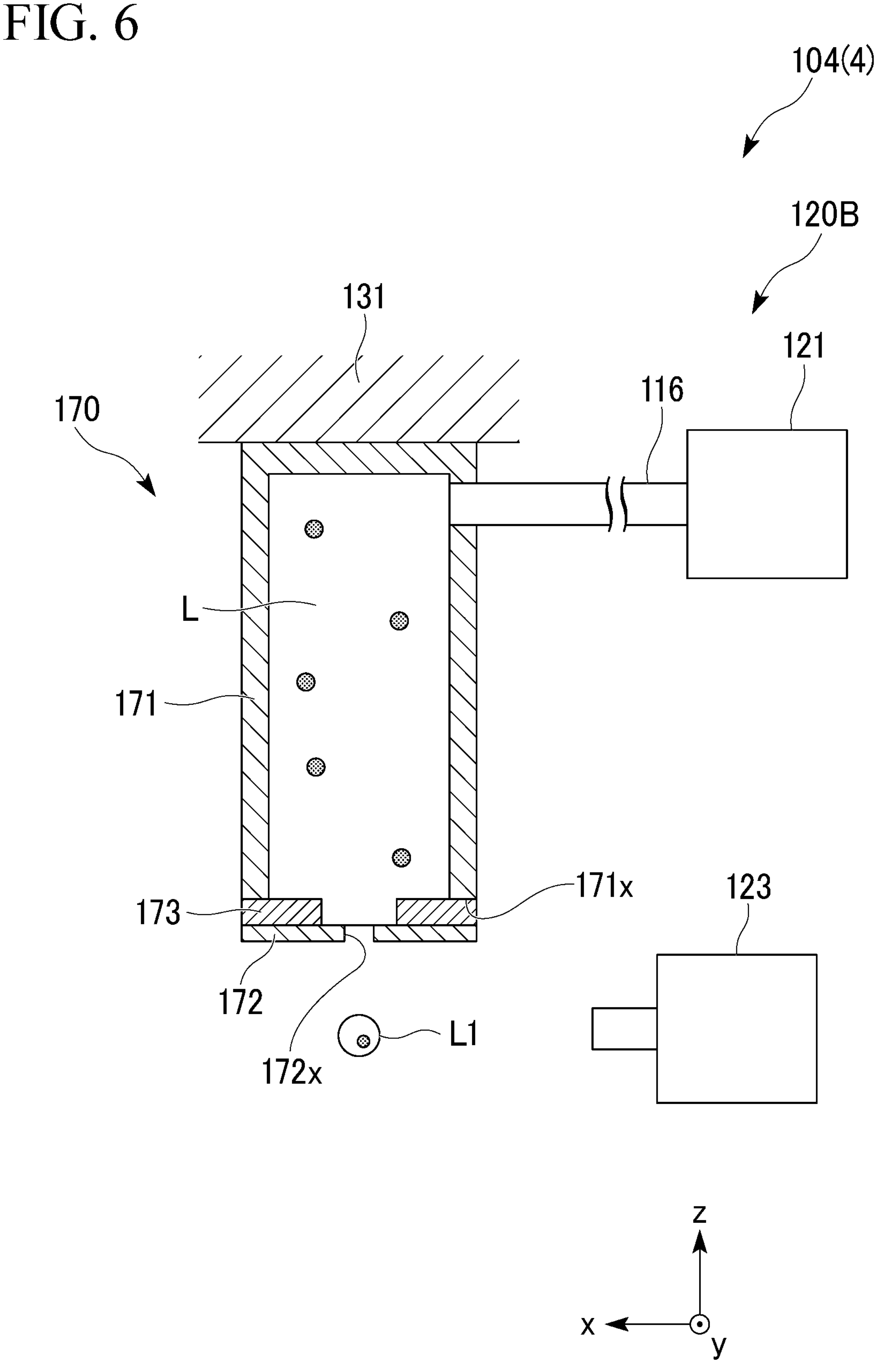
FIG. 6 is an explanatory diagram of a liquid ejection unit and a liquid ejection device according to a fourth embodiment.

FIG. 6 is an explanatory diagram of a liquid ejection unit and a liquid ejection device according to a fourth embodiment of the present invention and is a diagram corresponding to FIGS. 2, 4, and 5. A liquid ejection unit 104 in this embodiment is partially the same as the liquid ejection unit in the above-described embodiment. Therefore, constituent elements in this embodiment that are the same as those of the above-described embodiment will be the same reference symbols and a detailed description thereof will be omitted.

The liquid ejection unit 104 includes a liquid ejection head 170 and a pressure adjustment section 120B.

A liquid ejection device 4 in this embodiment has a constitution in which the liquid ejection unit 101 in the above-described liquid ejection device 1 is replaced with the liquid ejection unit 104.

A liquid ejection head 170 includes a liquid holding section 171, a nozzle plate 172, a displacement member 173, and a pipe 116.

(Liquid Holding Section)

The liquid holding section 171 is a tubular member whose lower end in the z axis direction is open. A liquid L is held inside the liquid holding section 171. Furthermore, an upper portion of the liquid holding section 171 is connected to the pipe 116.

A lower end portion 171*x* of the liquid holding section 171 is closed by the nozzle plate 172 and the displacement member 173. A liquid L is held in a space surrounded by the liquid holding section 171, the nozzle plate 172, and the displacement member 173.

(Nozzle Plate)

The nozzle plate 172 is an annular member having an ejection port 172*x*. The nozzle plate 172 closes the lower end portion 171*x* of the liquid holding section 171. The ejection port 172*x* communicates with the liquid holding section 171.

A planar shape of the nozzle plate 172 and a size, a material, and a structure thereof when viewed in a plan view are not particularly limited and can be appropriately selected in accordance with the purpose.

Examples of a planar shape of an outer edge of the nozzle plate 172 include a circle, an ellipse, a rectangle, a square, and a rhombus. For example, when a shape of the outer edge of the nozzle plate 172 is circular, the nozzle plate 172 is an annular member.

An end portion of the nozzle plate 172 on the ejection port 172*x* side is not supported and can vibrate upward and downward. When the end portion of the nozzle plate 172 on the ejection port 172*x* side vibrates, a force is applied to the liquid L in the vicinity of the ejection port 172*x* downward and the liquid L is ejected through the ejection port 172*x* as a liquid droplet L1.

If a material of the nozzle plate 172 is too soft, the nozzle plate 172 easily vibrates. In addition, it is not easy to minimize the vibration immediately when ejecting is not performed. Thus, it is desirable to utilize a material having a certain degree of hardness.

Examples of the material of the nozzle plate 172 include metals, ceramics, polymer materials, and the like. Specific examples of the material of the nozzle plate 172 include stainless steel, nickel, aluminum, silicon dioxide, alumina, zirconia, and the like.

An opening shape of the ejection port 172*x* can be appropriately selected in accordance with the purpose. Examples of the opening shape of the ejection port 172*x* include a circle, an ellipse, a quadrangle, and the like. Among these, it is desirable that the opening shape of the ejection port 172*x* be circular.

An average opening diameter of the ejection port 172*x* is not particularly limited and can be appropriately selected in accordance with the purpose. When a liquid L to be ejected is a dispersion liquid, it is desirable that the opening shape of the ejection port 172*x* be twice or more a maximum diameter of a dispersoid such as cells dispersed in the liquid L to prevent clogging of the ejection port 172*x* with the dispersoid.

(Displacement Member)

The displacement member 173 vibrates the nozzle plate 172 to eject a liquid droplet L1 through the ejection port 172*x*.

The displacement member 173 is arranged between the lower end portion 171*x* of the liquid holding section 171 and the nozzle plate 172 and closes the lower end portion 171*x* of the liquid holding section 171.

The shape, the size, the material, and the structure of the displacement member 173 are not particularly limited and can be appropriately selected in accordance with the purpose.

The shape and an arrangement of the displacement member 173 are not particularly limited as long as the effects of the present invention are not impaired and can be appropriately designed in accordance with the shape of the nozzle plate 172. For example, when the planar shape of the nozzle plate 172 is a circular planar shape, it is desirable to provide the displacement member 173 concentrically around the ejection port 172*x*.

It is desirable that a piezoelectric element be appropriately used as the displacement member 173. As the piezoelectric element, a member having the same constitution as the piezoelectric element adopted for the displacement member 113 can be utilized.

In the liquid ejection unit 104 as described above, first, when a liquid L in the liquid holding section 171 is pressurized in the supply section 121, in the ejection port 172*x* in the liquid holding section 171, a part of the liquid L held in the liquid holding section 171 is pushed out and a meniscus is formed.

Subsequently, when a part of the liquid L held in the liquid holding section 171 is displaced by driving the displacement member 173, a liquid droplet L1 is ejected.

With the liquid ejection unit 104 configured as described above, it is possible to provide a liquid ejection unit which can appropriately eject a highly viscous liquid.

In addition, with the liquid ejection device 4 configured as described above, since the above-described liquid ejection unit is provided, it is possible to appropriately eject a highly viscous liquid.

Although the preferred embodiments of the present invention have been described above with reference to the accompanying drawings, the present invention is not limited to the embodiments. The shapes, the combinations, and the like of the constituent elements illustrated in the above-described examples are merely examples and can be variously changed on the basis of design requirements and the like without departing from the gist of the present invention.

Among the constitutions of the liquid ejection unit and the liquid ejection device described in the above-described first to fourth embodiments, constitutions which achieve the same effects can be exchanged with each other as long as the effects of the present invention are not impaired.

For example, the liquid ejection device in the first embodiment may include the detection unit 123 included in the liquid ejection device described in the second to fourth embodiments instead of the detection unit 122.

Similarly, the liquid ejection device described in the second to fourth embodiments may include the detection unit 122 included in the liquid ejection device in the first embodiment instead of the detection unit 123.

Also, among the constitutions of the liquid ejection unit and the liquid ejection device described in the first to fourth embodiments, constitutions which achieve the same effects may be achieved may be repeatedly included as long as the effects of the present invention are not impaired.

For example, the liquid ejection device may include both of the detection unit 122 and the detection unit 123. In this case, the control unit 50 may obtain the pressure of the liquid L on the basis of the detection result of both of the detection unit 122 and the detection unit 123 and control the pressure of the liquid L.

Also, when the liquid ejection device described in the first to fourth embodiments includes a plurality of liquid ejection units, all of the plurality of liquid ejection units have the same constitution and may have two or more types selected from the group consisting of the liquid ejection units 101 to 104 described above.

The present invention includes the following aspects.

[1] A liquid ejection unit includes: a liquid holding section having an ejection port through which a liquid is ejected and configured to hold the liquid; a pressure adjustment section configured to adjust a pressure of the liquid held in the liquid holding section; and a displacement member configured to displace at least a part of the liquid whose pressure is adjusted and eject the liquid from the liquid holding section.

[2] In the liquid ejection unit according to [1], the displacement member which is configured to displace the liquid holding section substantially parallel to an ejection direction of the liquid.

[3] In the liquid ejection unit according to [2], the liquid holding section is a tubular member extending substantially parallel to the ejection direction of the liquid, the liquid holding section and the displacement member are arranged to overlap when viewed in a plan view, and a shape of the liquid holding section when viewed in a plan view is smaller than a shape of the displacement member when viewed in a plan view.

[4] In the liquid ejection unit according to any one of [1] to [3], a supply section configured to supply the liquid to the liquid holding section is provided and the supply section is also configured to function as the pressure adjustment section.

[5] In the liquid ejection unit according to any one of [1] to [3], at least a part of the liquid holding section is formed of an elastic material and the pressure adjustment section is a unit provided in a place of the liquid holding section formed of the elastic material and configured to change a volume of the liquid holding section by deforming the liquid holding section.

[6] In the liquid ejection unit according to any one of [1] to [5], the pressure adjustment section includes a detection unit configured to directly or indirectly detect a pressure of the liquid which is held in the liquid holding section and whose pressure is adjusted.

[7] In the liquid ejection unit according to [6], the detection unit is configured to detect a pressure of the liquid which is held in the liquid holding section and whose pressure is adjusted and the pressure adjustment section is configured to adjust the pressure of the liquid to approach a predetermined set value of the ejecting pressure of the liquid on the basis of the detection result of the detection unit.

[8] In the liquid ejection unit according to [6], the detection unit is configured to observe a meniscus formed in the ejection port and the pressure adjustment section is configured to adjust the pressure of the liquid to approach a predetermined set value of the ejecting pressure of the liquid on the basis of at least one of a formation position of the meniscus or movement information of the meniscus.

[9] In the liquid ejection unit according to [6] or [8], the detection unit is configured to observe a liquid droplet ejected from the liquid holding section and the pressure adjustment section is configured to adjust the pressure of the liquid to approach a predetermined set value of the ejecting pressure of the liquid on the basis of at least one selected from the group consisting of the flight position of the liquid droplet, the shape of the liquid droplet, the volume of the liquid droplet, and the speed of the liquid droplet.

[10] In the liquid ejection unit according to [9], the detection unit is an imaging device or a laser measuring device.

[11] In the liquid ejection unit according to any one of [1] to [10], the liquid is a dispersion liquid containing particles and a dispersion medium having the particles dispersed therein.

[12] In the liquid ejection unit according to [11], the particles are cells.

[13] A liquid ejection device includes: the liquid ejection unit according to any one of [1] to [12].

[14] In the liquid ejection device according to [13], a plurality of the liquid ejection units are provided and the plurality of liquid ejection units are arranged in a direction intersecting an ejection direction of the liquid.

According to the liquid ejection unit described in any one of [1] to [12] and the liquid ejection device described in [13] or [14], it is possible to achieve an object of the present invention by solving the problems in the related art.

EXPLANATION OF REFERENCES

1, 2, 3, 4 Liquid ejection device
50 Control unit

101, 102, 103, 104 Liquid ejection unit
110, 160, 170 Liquid ejection head
111, 161, 171 Liquid holding section
111*a*, 161*x*, 172*x* Ejection port
113, 163, 173 Displacement member
120A, 120B, 120C Pressure adjustment section
121 Supply section
122, 123 Detection unit
127 Pressing section (piezoelectric element)
L Liquid
L1 Liquid droplet
LM Meniscus

What is claimed is:

1. A liquid ejection unit, comprising:

a liquid holding section which has an ejection port through which a liquid is ejected and which holds the liquid;

a pressure adjustment section comprising a supply section and 1) detection unit which is fluidly connected in parallel to said supply section, with said liquid holding section or 2) an optical detection unit and which is configured to adjust a pressure of a liquid held in the liquid holding section; and a displacement member which is configured to displace at least a part of the liquid whose pressure is adjusted and eject the liquid from the liquid holding section, wherein the displacement member which is configured to displace the liquid holding section substantially parallel to an ejection direction of the liquid, the liquid holding section is a tubular member extending substantially parallel to the ejection direction of the liquid, the liquid holding section and the displacement member are arranged to overlap when viewed in a plan view, and a shape of the liquid holding section when viewed in a plan view is smaller than a shape of the displacement member when viewed in a plan view.

2. The liquid ejection unit according to claim 1, wherein said pressure adjustment section comprise an optical detection unit;

at least a part of the liquid holding section is made of an elastic material, and the pressure adjustment section comprises a unit provided in a place of the liquid holding section made of the elastic material and is configured to change a volume of the liquid holding section by deforming the liquid holding section.

3. The liquid ejection unit according to claim 1, wherein the detection unit is configured to detect the pressure of the liquid which is held in the liquid holding section and whose pressure is adjusted, and the pressure adjustment section is configured to adjust the pressure of the liquid to approach a predetermined set value of the ejecting pressure of the liquid on the basis of the detection result of the detection unit.

4. The liquid ejection unit according to claim 1, wherein the detection unit is configured to observe a meniscus formed in the ejection port, and the pressure adjustment section is configured to adjust the pressure of the liquid to approach a predetermined set value of the ejecting pressure of the liquid on the basis of at least one of a formation position of the meniscus or movement information of the meniscus.

5. The liquid ejection unit according to claim 1, wherein the detection unit is configured to observe a liquid droplet ejected from the liquid holding section, and the pressure adjustment section is configured to adjust the pressure of the liquid to approach a predetermined set value of the ejecting pressure of the liquid on the basis of at least one selected from the group consisting of a flight position of the liquid droplet, a shape of the liquid droplet, a volume of the liquid droplet, and a speed of the liquid droplet.

6. The liquid ejection unit according to claim 5, wherein the detection unit is an imaging device or a laser measuring device.

7. The liquid ejection unit according to claim 1, wherein the liquid is a dispersion liquid containing particles and a dispersion medium having the particles dispersed therein.

8. The liquid ejection unit according to claim 7, wherein the particles are cells.

9. A liquid ejection device, comprising:

the liquid ejection unit according to claim 1.

10. The liquid ejection device according to claim 9, comprising:

a plurality of the liquid ejection units, wherein the plurality of the liquid ejection units are arranged in a direction intersecting an ejection direction of the liquid.

11. The liquid ejection device according to claim 1, wherein said pressure adjustment section comprising a supply section and detection unit which is fluidly connected in parallel to said supply section, with said liquid holding section.

* * * * *